United States Patent Office 3,015,953
Patented Jan. 9, 1962

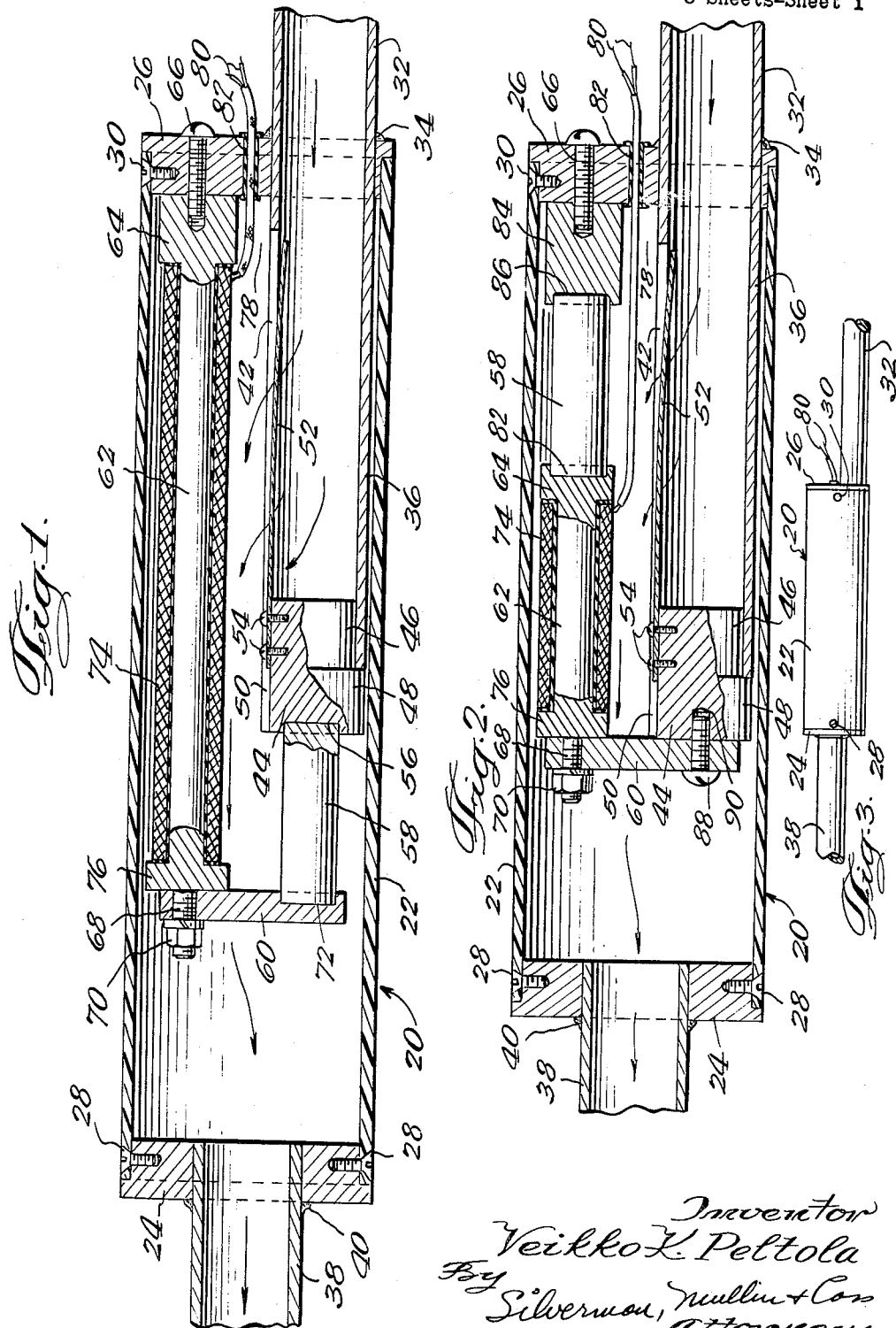

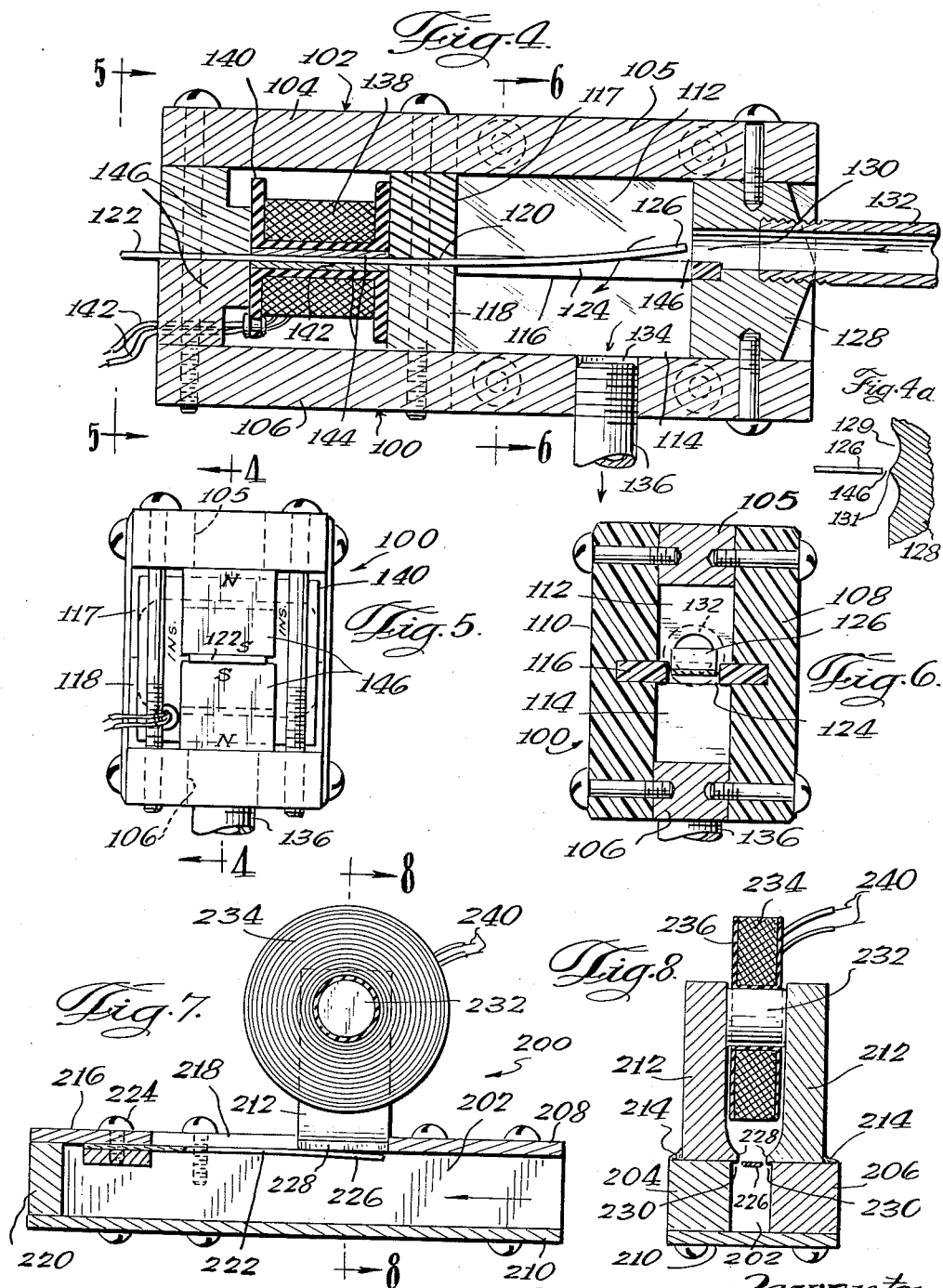

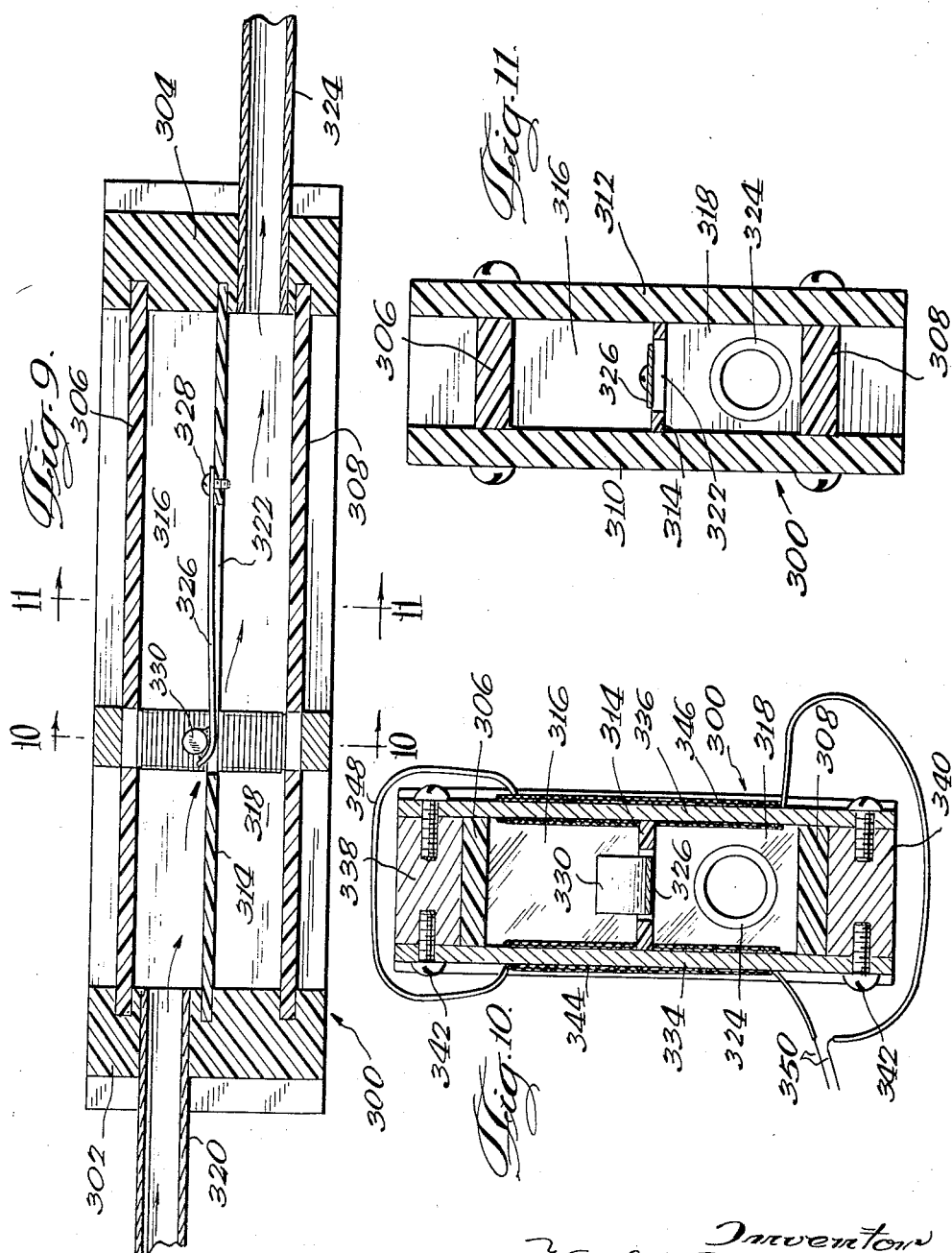

3,015,953
MAGNETIC AIR VELOCITY TRANSDUCER
Veikko K. Peltola, Chicago, Ill., assignor to Illinois Testing Laboratories, Inc., Chicago, Ill., a corporation of Illinois
Filed June 12, 1957, Ser. No. 665,344
19 Claims. (Cl. 73—194)

This invention relates generally to transducers and more particularly is concerned with a magnetic air velocity transducer, useful especially for providing an electrical signal whose characteristics vary with the velocity of air passing through the apparatus.

Moving vane anemometers are quite well-known in the art of measuring air velocity, but several disadvantages are attendant upon the use of such equipment. Primarily, where it is desired to indicate the velocity of a moving stream of air (or any other gas) at a remote station, it is necessary to have long tubes for conducting the air or gas to the device, which is awkward. Where there is any likelihood of explosion, the thermoanemometer cannot be used because of the need for using a heated element of some kind, likely to come into contact with explosive gases.

An important object of this invention lies in the provision of magnetic apparatus which will eliminate the disadvantages of the moving vane anemometer and/or thermo-anemometer.

Another object of the invention is the provision of a novel apparatus for measuring the velocity of a moving gas such as air through the use of a vibrating reed and having means for converting the vibration of the reed into an electrical signal whose amplitude varies with the velocity of air to which the reed is subjected.

Still a further object of the invention is the provision of an air velocity transducer which includes a chamber having a vibrating reed therein, there being provided a magnetic circuit in which the reed is a portion of said circuit, or carries a portion of said circuit, whereby the vibrations of the reed caused by the passage of air thereover, will vary the character of the magnetic circuit and thereby vary the voltage induced in a winding inductively associated with the said circuit.

Still a further object of the invention is the provision of a magnetic air velocity transducer which includes a magnetic circuit having a source of magnetic flux, a reed subjected to the flow of air and adapted to be vibrated thereby, and a pick-up coil so related to the magnetic circuit as to have a voltage induced therein by reason of the flux of the said circuit, the reed vibrations effecting changes in the flux of the said circuit whereby the voltage induced will vary as the amount of deflection of the reed.

It will be apparent that many variations of the basic invention are possible, and as a matter of complete explanation of the invention, several preferred embodiments are illustrated and described in considerable detail hereinafter, showing various transducers in different kinds of housings and surroundings. Several different types of magnetic circuits are also illustrated, and will be obvious that the structures illustrated are not intended to be examples of the only types which can be used in the practice of the invention. It will be noted also that while three of the examples operate by virtue of variations in the reluctance of the circuit modulating the flux of the circuit, and only one operates by varying the flux of the circuit, both of these types of systems are considered effective. Both will produce the desired results, and variations of both are well within the scope of the invention.

In the drawings which follow, these preferred forms are illustrated, more or less diagrammatically, but with sufficient detail to indicate the exact manner of constructing an operable device, all of the devices illustrated having been built, successfully tested and operated. In the said drawings:

FIGS. 1 and 2 are sectional views through transducers of the type which can be inserted into an air line to remain permanently in place for the continuous measurement of the velocity of the moving air, each being of somewhat different form.

FIG. 3 is a side elevational view of the exterior appearance of the transducers of FIGS. 1 and 2.

FIG. 4 is a median sectional view through another form of transducer embodying the invention.

FIG. 4a is a fragmentary diagrammatic sectional view of a modified form of the transducer of FIG. 4.

FIGS. 5 and 6 are transverse sectional views taken through the apparatus of FIG. 4 along the lines 5—5 and 6—6 respectively.

FIG. 7 is a sectional view through still another form of the invention.

FIG. 8 is a sectional view through the transducer of FIG. 7 taken along the line 8—8 of FIG. 7 and in the indicated direction.

FIG. 9 is a median sectional view through a form of the invention which utilizes a varying flux for producing an electrical signal varying with air velocity.

FIGS. 10 and 11 are sectional views taken respectively along the lines 10—10 and 11—11 of FIG. 9 respectively.

Referring now to FIGS. 1, 2 and 3, the reference character 20 designates an air velocity transducer which is designed to be inserted in a line carrying air or some other gas. The transducer is housed in an elongate cylindrical casing 22 having the ends thereof closed off by means of cap members 24 and 26 which are secured by suitable set screws 28 and 30. An air inlet conduit 32 is secured to the cap member 26 by brazing 34 or the like and has a substantial portion 36 extending into the housing. The conduit 32 has the air or other gas flowing therein and passes the same into the housing 22, while the air flows out of the housing by way of the outlet conduit 38 which is brazed as at 40 or otherwise secured to the end cap 24.

It is preferred that the outlet conduit 38 be secured coaxial with the housing 22 while the inlet conduit 32 be secured eccentrically relative the housing.

The upper wall of the extension 36 is slotted substantially throughout its length as at 42 and the end thereof is closed off by a plug 44 which has a reduced diameter portion 46 which enters the end, the enlarged diameter portion 48 being external of the extension 36 and conveniently of the same external diameter. The plug 44 may be grooved throughout its length at 50 and a relatively flat, elongate spring steel reed 52 is secured in the slot by some fastening means 54 with the majority of the reed 52 disposed within the slot 42 in the path of incoming air to be vibrated thereby. The plug 44 is made of ferrous metal such as soft iron having high permeability because it forms part of a magnetic circuit to be described. Obviously the groove 50 is aligned with the slot 42.

It will be noted that FIG. 1 and FIG. 2 are different from one another, showing two forms of the transducer 20. In FIG. 1 the end of the plug 44 has a socket 56 formed therein and a cylindrical permanent magnet 58 is seated therein coaxial with the plug 44. The magnet 58 is clamped in place by means of the yoke 60 and the elongate tie rod 62. The tie rod 62 has an enlarged head 64 at its right hand end by means of which the tie rod 62 is fastened to the inner face of the end cap 26 by means of a suitable screw 66 engaging a screw-threaded hole in the end of the tie rod. The left hand end of the tie rod 62 may be provided with a threaded stud 68 which passes through an opening in the yoke 60 and is secured thereto by means of washers and nut 70. A socket 72 is provided in the yoke 60 to receive the left end of the permanent magnet 58.

The tie rod 62 also functions as the core for a winding 74 which is wound along the length thereof between the enlarged portion 64 and another enlarged portion 76 with suitable insulation between the winding 74 and the tie rod 62.

The yoke 60 and tie rod 62 are formed of ferrous metal such as soft iron. Likewise, plug 44 and reed 52 are of ferrous metal. The magnet 58 is of any known type having high flux output. The other parts of the transducer 20 are formed of non-ferrous metals such as copper, brass, bronze and the like or plastic materials. It will be seen that there is a magnetic path or circuit established which may be traced as follows: from the source of magnetic flux comprising the magnet 58 through the plug 44 and the reed 52, across the gap 78 between the end of the reed and the enlarged portion 64, through the tie rod 62 and the yoke 60 back to the source 58.

When air is blown through the inlet tube or line 32 into the extension 36, which forms a closed chamber, the air is relieved by vibrating the reed 52. The width of the gap 78 will vary with the movement of the reed, causing a change in reluctance of the gap and thus modulating the flux of the magnetic circuit. Since the winding 74 surrounds the elongate tie rod 62 through which the flux will thread, change in the flux will cause an electromotive force to be induced in the winding the frequency of which in this case is identical to the frequency of vibration of the reed 52, and the amplitude of which will vary with the amplitude of the reed 52. The electrical ends 80 of the winding 74 are led through a suitable passageway 82 in the cap 26. A signal will thus appear across the leads 80, and can be measured, recorded or used to drive control or feedback equipment. This can be done remotely with no difficulty.

The structure of FIG. 2 is more compact, although the signal obtained therefrom is not as great as obtainable from the structure of FIG. 1. Here the winding 74 is mounted on a shorter core member 62, the enlarged right hand end 64 being provided with a socket 82 to seat the magnet 58, whose position has been changed. A cylindrical member 84 provided with a socket 86 for seating the right hand end of the magnet 58 is secured to the cap 26 by means of the screw 66. The yoke 60 is fastened to stud 68 in the same manner as in FIG. 1, but its lower end is secured directly to the plug 44 by a suitable screw 88 which passes through the said lower end and engages in a suitable screw threaded hole 90 now provided in the end of the plug.

The structure of FIG. 2 operates in the same manner as that of FIG. 1 with the vibration of the reed 52 varying the magnetic reluctance of the gap 78. It is probable that the loaction of the reed 52 adjacent the magnet 58 in FIG. 2 provides more variation in the flux than would be occasioned merely by varying the width of the gap, since there is no doubt considerable leakage or fringing flux or both which normally is established between the reed and the magnet 58 exclusive of the cylindrical member 84, which of course is made from some ferrous metal such as soft iron. With decrease in the dimensions of the structure so that the reed is close to the magnet, the leakage and fringe effect may be increased, but the possibility of the magnet damping the free vibration of the reed must be considered.

The frequency of vibration of the reed is normally a function of the physical dimensions of the reed, and hence, unless influenced by other factors the frequency of change of the reluctance of the gap will be constant, regardless of the velocity of passing air. The excursion or deflection of the reed in its vibration, however, will be a function of the velocity of the passing air, and hence, the amplitude of the signal at the output 80 of either of the forms of FIG. 1 and FIG. 2 will be a function of the velocity of the air passing through the device 20.

FIGS. 4, 5 and 6 illustrate another form of the invention which is designated 100. The housing 102 has top and bottom walls 104 and 106 of some high permeability ferrous material such as soft iron, the right hand portion of each wall being narrowed as at 105 so that right and left side walls 108 and 110 may be secured thereto to form upper and lower chambers 112 and 114 therewith. The walls 108 and 110 are non-ferrous material, such as brass, plastic and the like, and the horizontal dividing partition 116 is also of such non-ferrous material.

A vertical partition having upper and lower parts 117 and 118 closes off the left hand side of both chambers 112 and 114 as viewed in FIG. 4 and is provided with a narrow rectangular center opening 120 through which the reed 122 extends. It will be seen that the reed is of such length as to extend from the left hand end of the device 100, through the opening 120 and substantially the full length of the horizontal dividing partition 116. The partition has a central elongate slot 124 with which the free end 126 of the reed is aligned for vertical vibration, as will be explained. The right hand side of the chambers 112 and 114 is blocked off by a wall 128 which is also of high permeability metal having a suitable recess to support the right hand end of the horizontal partition 116 and having a passageway 130 opening to the upper chamber 112. An inlet tube or line 132 leads air or other gas to flow into the chamber 112. As the air flows through the chamber 112 it will be relieved by vibration of the reed end 126, through the slot 124 to the bottom chamber 114 from which it escapes by way of the passageway 134 in the bottom wall 106 and passes out the exhaust line or tube 136.

To the left of the vertical partition 117—118 as viewed in FIG. 4, there is provided a winding 138 mounted on a suitable spool or form 140 and having leads 142 extending therefrom by means of which the voltage generated in the winding can be used for measuring the velocity of air passing through the device. The spool 140 has a central passageway 142 through which the left hand portion of the reed 122 extends, and suitable core members 144 of high permeability ferrous metal may be used to center the reed 122 within the central passageway 142 and to increase the flux threading the reed. To the left of the spool 140 are provided a pair of permanent magnets 146 on opposite sides of the reed 122 and clamped thereto, with their poles arranged in opposition as shown by the polar designations in FIG. 5.

The entire device is held in assembly by suitable fastening means such as screws or the like, as illustrated in the figures and not designated.

The principles of operation of this device 100 are substantially the same as those of the devices described in connection with FIGS. 1, 2 and 3. The source of flux in this case comprises the pair of magnets 146, and the circuit is somewhat different, but still has a portion where the reluctance will be varied by the vibration of the reed 126. Commencing with the magnets 146, the total flux produced divides, a portion going through the upper wall 104 and an equal portion going through the bottom wall 106 (presuming physical symmetry of the structure). The flux passes along the top and bottom walls to the narrow portions 105 and thence to the right hand wall 128 which is actually a bridging yoke for the circuit. Here the flux comes together to pass through the reed 122 back to the magnets 146, but in the meantime passing through the center of the winding 138 and affecting the winding by producing an E.M.F. therein. The flux is required to pass a gap 146 the reluctance of which will be varied as the reed end 126 vibrates, and hence the E.M.F. induced in the winding 138 will have an amplitude which is directly related to the deflection of the reed end 126 as the air or gas vibrates the same. The excursion of the reed varies with the velocity of the air or gas.

The transducer 100 has several important features which are of considerable advantage. It is desirable to have a frequency of the output signal which is as high as possible in order to reduce the physical dimensions of the components which are used with the transducer, especially transformers and other equipment of the electrical circuits. The natural mechanical frequency of the reed 126 increases with decrease in reed dimensions, but the level of signal produced also decreases with decrease of reed dimensions. In this transducer there actually are two parallel magnetic circuits, each carrying the flux produced by the respective magnets. This provides a heavy flux density at the gap 146. (The reed is shown deflected an exaggerated amount for clarity in illustration.) Minimum reluctance occurs when the reed end 126 is at the magnetic center of the yoke 128, its quiescent position, and maximum reluctance occurs when the reed is at the top and bottom of its excursion. Thus, for each complete cycle of movement of the reed, there are two maximum reluctance positions of the reed. In the transducer of FIGS. 1 to 3, there is only one maximum reluctance position, and hence for a reed which vibrates symmetrically with respect to its gap, the frequency of the signal will be twice the natural mechanical frequency of the reed. That is true of transducer 100.

FIG. 4a shows a structure for concentrating the flux and increasing the gradient between maximum and minimum reluctance excursions, hence increasing the change in flux of the magnetic circuit. In this structure the yoke 128 is shaped to provide a sharp polar projection 131 at which the flux density is highly increased. This is done by recessing the yoke 128 as at 129 on opposite sides of the pole 131 to decrease fringing of flux. The opening 130 is not shown, but can be located in any convenient place to preserve the polar configuration. Obviously the pole 131 is aligned with the quiescent position of the reed.

In FIGS. 7 and 8 another transducer 200 is illustrated which is constructed in accordance with the invention, the same being somewhat different form from those previously discussed. Here the inlet air or gas is admitted to an elongate chamber 202 which is shown having rectangular cross section, formed by side walls 204 and 206 and top and bottom walls 208 and 210 respectively, from the right hand end thereof as viewed in FIG. 7. The top wall 208 terminates in the center of the transducer 200, and at that point a pair of vertical standards 212 formed of some ferrous material of high permeability is secured. Each of the standards may, for example, be brazed to the top surfaces of the side walls 204 and 206 respectively as shown at 214. A continuation of the top wall 208 is provided on the opposite side of the vertical standards 212, as shown at 216 and a slot 218 is formed therein to relieve the chamber 202, the left hand end of the chamber 202 being blocked off at 220.

A reed 222 is secured at 224, aligned with the slot 218 and having its end 226 disposed between the narrow, inwardly extending integral poles 228 formed on the bottom ends of the standards 212. It is appreciated that there will be a concentration of flux at this position, as described in connection with FIG. 4a, and that the dimensions of the gaps 230 formed between the end of the reed and the poles 228 will vary as the reed 222 vibrates from its quiescent position. The upper ends of the standards 212 have a cylindrical permanent magnet 232 engaged therebetween and the magnet is coaxial with a large disc-like winding of wire or tape 234 mounted on a suitable insulating spool 236. The signal produced appears at leads 240.

The magnetic circuit in this case is quite simple, and comprises only the standards 212, the reed end 226 and the permanent magnet 232. The remaining structure of the transducer 200 is formed of non-magnetic material such as non-ferrous metals or plastic. Since the reed 22 moves substantially symmetrically with respect to the poles 228, the frequency of the signal output will be twice the natural frequency of the reed 222 for reasons given above.

In FIGS. 9, 10 and 11 there is illustrated another form of the invention in which the signal output is dependent upon a change of flux, rather than a change of reluctance of a gap as in the previously described forms. Here there is a transducer 300 which has end walls 302 and 304, a top wall 306 and a bottom wall 308, assembled to side walls 310 and 312 by suitable bolts, screws and the like. A horizontal partition 314 divides the interior of the transducer 300 into upper and lower chambers 316 and 318 respectively. Air or other gas enters the upper chamber on the left by way of the inlet tube 320 which passes through a suitable opening formed therefor in the left end wall 302, is relieved by way of the slot 322 formed in the partition 314 to the lower chamber 318 and passes out through the outlet tube 324 which communicates with the lower chamber 318 by a suitable opening in the end wall 304.

A reed 326 of any suitable ferrous or non-ferrous material is secured to the partition 314 at 328 in alignment with the slot 322 and adapted to vibrate when air passes through the device. At its free end there is cemented or otherwise secured a permanent magnet 330 so that when the reed vibrates, the permanent magnet will oscillate up and down as viewed in the figures. The magnet is shown quite large in the view, but it will be appreciated that extremely minute permanent magnets can be used whereby the natural frequency of the reed 326 will be governed principally by its length, rather than by the weight of the magnet.

The side walls are discontinued in the center of the transducer 300 at the position of the magnet 330, and a magnetic circuit is disposed thereat. The magnetic circuit is preferably formed of a rectangular core of high permeability material, such as soft iron, comprising the side members 334 and 336 which extend from top to bottom of the device 300 and bridging yokes 338 and 340 top and bottom respectively, connected by the screws 342. The structural walls of the transducer 300 and the partition 314 are suitably notched and cut away to enable the core to be placed, as described. The portions of the side members 334 and 336 which are disposed alongside of the chambers 316 and 318 are wound with wire, there being one winding 344 formed on the side member 334 and another winding 346 formed on the side member 336. The windings may be formed of several layers of fine wire, depending upon the available space and are connected across their top ends by the lead 348. Their terminals 350 form the output of the transducer 300 across which the signal appears. The direction of winding and the manner of connecting the parts 344 and 346 must be chosen so that the voltage induced in the said winding reinforce instead of oppose.

The source of flux in this construction comprises the magnet 330. As the reed is vibrated, the magnet 330 moves up and down, as best seen in FIG. 10, and its magnetic field therefor cuts the wires of the windings 344 and 346. Although the total flux from the magnet does not vary, it could be said that the flux in the core is varied at a frequency depending upon the natural frequency of the reed 326, and the E.M.F. induced in the windings will vary with an amplitude directly related to the excursion of the reed in its vibrating movements. The variation will be a sine wave, because in this case the distance of the magnet from the wires does not vary.

The amplitude of signal produced in transducer 300 depends upon the rate at which the magnetic flux and the wires of the windings 344 and 346 move relative one another. Note that for each cycle, there will be two maxima of amplitude, but of opposite polarity since the reed is moving in opposite directions at its maximum velocity. Because of this, the frequency of the signal output will be equal to the natural frequency of the reed.

Those skilled in this art will appreciate that the production of a signal in all structures described does not depend upon the existence of a core. The core confines the flux and eliminates leakage and fringing. For the structure 300, for example, it is easy to see that the magnet 330 could move relative to a coil of wire and induce a voltage therein without the need for a core. Because of this, reference in the claims to a magnetic circuit is not to be construed as including core members in every case.

Considerable variations in the construction of the transducers of the invention can be made without in any way departing from the spirit or scope of the invention as set forth in the appended claims.

What it is desired to secure by Letters Patent is:

1. A magnetic transducer for providing a signal related to the velocity of a gas, comprising a chamber having an inlet and a slotted outlet, a reed having an end fixedly secured adjacent said chamber with the reed disposed in said slot for free vibration whereby gas admitted to said inlet and relieved through said slot will cause vibration of said reed at a constant frequency but with a deflection varying with gas velocity, and a magnetic circuit having flux threading the same and arranged so that the vibration of said reed modulates the flux of said magnetic circuit for providing a signal corresponding to the deflection of said reed.

2. A magnetic transducer for providing a signal related to the velocity of a gas, comprising a chamber having an inlet and an outlet, a free-ended reed having one end thereof fixedly mounted in the chamber and vibrating to a degree dependent on the velocity of the gas passing through said inlet and said chamber, a magnetic circuit having flux threading the same and having at least a portion thereof disposed adjacent the reed, the movement of said reed magnetically influencing said adjacent portions to modulate said flux in accordance with said movements, and means for producing a signal dependent upon the flux modulations.

3. A magnetic transducer as claimed in claim 1 in which a gap is provided in said magnetic circuit with said reed having a free end disposed in said gap and being formed of ferromagnetic material, whereby vibration of said reed varies the reluctance of said gap.

4. A magnetic transducer as claimed in claim 1 in which there is a source of flux mounted on said reed and vibrating therewith.

5. A magnetic transducer for providing a signal related to the velocity of a gas, comprising a chamber having means including a slot for admitting a gas thereto and passing the same through said chamber, a reed mounted in said chamber and having a fixed end and a free end adjacent said slot and adapted to vibrate to a degree dependent on the velocity of said gas, a source of flux mounted on said reed and moving therewith, and a winding inductively coupled with said source whereby said signal will appear across said winding.

6. A magnetic transducer as claimed in claim 1 in which said chamber has a rectangular ferromagnetic core and said reed is disposed to vibrate on the interior of said core, said winding being mounted on said core.

7. A magnetic transducer comprising a housing having a reed mounted therein with one end fixed and the remainder of the reed free, means including a slot for introducing a gas to said housing to pass over the free end of said reed and vibrate the same with a constant frequency and a deflection related to the velocity of said gas, a magnetic circuit in said housing arranged normal to the direction of movement of said reed, at least a portion of said reed having magnetic influence upon said magnetic circuit whereby vibration will modulate the flux of said circuit, and a winding inductively disposed relative said circuit such that the modulation will produce a signal in said winding.

8. A magnetic transducer as claimed in claim 7 in which there is a source of flux in said circuit remote from said reed, and the reed end is formed of ferromagnetic material, and the circuit has a gap with the free reed end vibrating in the gap and varying the reluctance thereof.

9. A magnetic transducer as claimed in claim 7 in which the reed has a source of flux mounted thereon, and said winding is arranged adjacent the reed so that movement of the reed will cause the flux of said source to cut the turns of said winding.

10. A magnetic transducer comprising a chamber having means for passing a gas therethrough, a reed mounted in the chamber with one end free to vibrate with the passage of air and the other end fixed, a ferromagnetic circuit having a source of flux and including said reed and a gap at the free end of said reed, and a pick-up coil inductively arranged relative said circuit.

11. A magnetic transducer for producing a signal related to the quantity of gas passing through a chamber comprising a reed of ferromagnetic material mounted in the chamber and having a fixed end and a free end adapted to be vibrated with passage of gas at its mechanical frequency, a magnetic circuit including said reed as a part thereof and having a gap between the vibrating part of said reed and a part of said circuit whereby flux must traverse said gap to complete said circuit, a source of flux in said circuit whereby vibration of said reed will vary the reluctance of said gap and modulate the flux in said circuit, and a winding inductively coupled to said circuit to provide said signal.

12. A transducer as claimed in claim 11 in which the said circuit part is laterally spaced from the quiescent position of said reed whereby the frequency of the signal is equal to said natural frequency.

13. A transducer as claimed in claim 11 in which the circuit part comprises a pole aligned with the quiescent position of said reed whereby reed deflection will carry the reed on opposite sides of said pole and thereby produce a signal the frequency of which is twice the said natural frequency.

14. A transducer as claimed in claim 11 in which said circuit part comprises a relatively sharp ended shaped pole whereby to provide high flux density in said gap.

15. A transducer for producing a signal related to the velocity of gas passing through a chamber including a slot traversed by said gas comprising a reed of ferromagnetic material mounted in said chamber and having a fixed end and a free end arranged adjacent said slot and vibrating in response to the passage of air through said slot and chamber, a pair of parallel ferromagnetic circuits having said reed as their common leg, opposed flux sources at one end of said pair to force the combined fluxes to thread said reed, a yoke at the opposite end across both circuits, the reed end being spaced from the center of the yoke to form a gap whose reluctance varies with the vibration of the reed, and a pick-up winding about said common leg.

16. A transducer for producing a signal related to the velocity of a gas, comprising a chamber having the gas passing therethrough, a reed mounted in the chamber for vibration as the gas passes therethrough having one end fixed and the other end free, a ferromagnetic circuit transverse of said reed and having a pair of tapered relatively sharp opposed poles with said reed aligned therewith when quiescent and spaced therebetween to form a pair of gaps between the poles and the reed, a source of flux in said circuit, and a winding inductively coupled to said circuit whereby to provide a signal therein as the reed vibrates relative said poles.

17. A gas velocity measuring apparatus comprising a housing, a reed disposed in said housing, said reed having a fixed end and a free end, means for applying a moving gas primarily against the free end to cause vibratory movement thereof whereby the amplitude of movement of said free end is dependent on the pressure exerted by said moving gas on said free end and in turn dependent on the velocity of said gas, and magnetic circuit means responsive to changes in the amplitude of movement of said free end to provide an electrical signal corresponding to said amplitude.

18. The arrangement claimed in claim 17 in which said means comprises structure forming a constricted opening through which said gas is passed against said free end at a distance spaced from said fixed end.

19. A gas velocity measuring apparatus as claimed in claim 17 in which said circuit means include structure establishing an electromagnetic field in the vicinity of the free end of said reed, whereby movement of said reed varies said field in accordance with said amplitude, and a signal output circuit responsive to the variations in said field.

References Cited in the file of this patent

UNITED STATES PATENTS

| | | |
|---|---|---|
| 1,935,445 | Heinz | Nov. 14, 1933 |
| 2,111,036 | Wippel | Mar. 15, 1938 |
| 2,448,298 | Fligue | Aug. 31, 1948 |
| 2,519,015 | Bensen | Aug. 15, 1950 |
| 2,809,520 | Richard | Oct. 15, 1957 |
| 2,895,063 | Morris | July 14, 1959 |